United States Patent
Gupta

(10) Patent No.: US 9,526,022 B2
(45) Date of Patent: Dec. 20, 2016

(54) ESTABLISHING OPERATING SYSTEM AND APPLICATION-BASED ROUTING POLICIES IN MULTI-MODE USER EQUIPMENT

(71) Applicant: Intel Corporation, Santa Clara, CA (US)

(72) Inventor: Vivek G. Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 13/711,338

(22) Filed: Dec. 11, 2012

(65) Prior Publication Data
US 2014/0040504 A1  Feb. 6, 2014

Related U.S. Application Data

(60) Provisional application No. 61/679,627, filed on Aug. 3, 2012.

(51) Int. Cl.
*G06F 15/16* (2006.01)
*H04W 24/10* (2009.01)
(Continued)

(52) U.S. Cl.
CPC ............. *H04W 24/10* (2013.01); *H04B 17/27* (2015.01); *H04L 5/00* (2013.01); *H04L 5/0035* (2013.01);
(Continued)

(58) Field of Classification Search
CPC .......... H04L 41/0803–41/082; H04L 41/0836; H04L 43/0811; H04L 65/4092; H04L 65/80; H04L 67/16; H04W 40/02–40/04; H04W 16/18; H04W 16/28; H04W 24/02; H04W 24/04; H04W 28/0221; H04W 36/14; H04W 52/00; H04W 52/0209; H04W 76/025; H04W 76/026; H04W 76/048; H04W 76/023; H04W 4/02; H04W 64/003; H04W 12/06; H04W 24/10; H04W 76/021; H04W 88/06; H04W 88/12; H04N 21/25825; H04N 21/23439; Y02B 60/50
See application file for complete search history.

(56) References Cited

U.S. PATENT DOCUMENTS 7,734,752 B2 * 6/2010 Zuk .................. H04L 29/06
                                                 709/205
8,761,099 B2   6/2014 Charbit et al.
(Continued)

FOREIGN PATENT DOCUMENTS

CN    101730172 A    6/2010
CN    102333343 A    1/2012
(Continued)

OTHER PUBLICATIONS

"Access Network Discovery and Selection Function (ANDSF) Management Object MO", 3rd Generation Partnership Project: Technical Specification Group Core Network and Terminals, Release 11, (Sep. 2012), 168.
(Continued)

*Primary Examiner* — Lance L Barry
(74) *Attorney, Agent, or Firm* — Schwegman Lundberg & Woessner, P.A.

(57) ABSTRACT

Techniques for establishing and implementing operating system and application-based routing policies for multi-mode wireless communication devices such as a user equipment (UE) are generally described herein. In some examples, information particular to the profile and platform configuration of the UE is communicated to an Access Network Discovery Function (ANDSF) server. The ANDSF server may provide an inter-system routing policy (ISRP) to handle appropriate network offloading actions for the particular application and device configuration. In some examples, the ISRP may be specific to flow-based or non-seamless based traffic offloading from certain software applications. The techniques described herein may be propagated from the ANDSF server and implemented in a variety of multi-mode UE mobile computing devices in connection with offloading policies established in a 3GPP Long Term Evolution/Long Term Evolution-Advanced (LTE/LTE-A) Evolved Packet Core (EPC) network architecture.

18 Claims, 8 Drawing Sheets

(51) Int. Cl.

| | | |
|---|---|---|
| H04W 24/04 | (2009.01) | |
| H04W 28/02 | (2009.01) | |
| H04W 52/00 | (2009.01) | |
| H04L 5/00 | (2006.01) | |
| H04L 12/24 | (2006.01) | |
| H04L 12/26 | (2006.01) | |
| H04L 12/807 | (2013.01) | |
| H04L 29/06 | (2006.01) | |
| H04L 29/08 | (2006.01) | |
| H04W 4/00 | (2009.01) | |
| H04W 8/18 | (2009.01) | |
| H04W 28/04 | (2009.01) | |
| H04W 36/00 | (2009.01) | |
| H04W 40/34 | (2009.01) | |
| H04W 52/02 | (2009.01) | |
| H04W 72/00 | (2009.01) | |
| H04W 72/04 | (2009.01) | |
| H04W 76/02 | (2009.01) | |
| H04W 24/02 | (2009.01) | |
| H04N 21/2343 | (2011.01) | |
| H04N 21/258 | (2011.01) | |
| H04W 40/02 | (2009.01) | |
| H04W 16/18 | (2009.01) | |
| H04W 76/04 | (2009.01) | |
| H04W 4/02 | (2009.01) | |
| H04W 12/06 | (2009.01) | |
| H04W 64/00 | (2009.01) | |
| H04W 88/06 | (2009.01) | |
| H04L 12/703 | (2013.01) | |
| H04B 17/27 | (2015.01) | |
| H04W 74/08 | (2009.01) | |
| H04W 16/28 | (2009.01) | |
| H04W 36/14 | (2009.01) | |
| H04W 88/12 | (2009.01) | |
| H04W 92/18 | (2009.01) | |

(52) U.S. Cl.
CPC ........ *H04L 5/0057* (2013.01); *H04L 41/0659* (2013.01); *H04L 41/0836* (2013.01); *H04L 43/0811* (2013.01); *H04L 45/28* (2013.01); *H04L 47/27* (2013.01); *H04L 65/1006* (2013.01); *H04L 65/4092* (2013.01); *H04L 65/80* (2013.01); *H04L 67/16* (2013.01); *H04L 67/303* (2013.01); *H04N 21/23439* (2013.01); *H04N 21/25825* (2013.01); *H04W 4/00* (2013.01); *H04W 4/005* (2013.01); *H04W 4/008* (2013.01); *H04W 4/02* (2013.01); *H04W 8/18* (2013.01); *H04W 12/06* (2013.01); *H04W 16/18* (2013.01); *H04W 24/02* (2013.01); *H04W 24/04* (2013.01); *H04W 28/0221* (2013.01); *H04W 28/0236* (2013.01); *H04W 28/04* (2013.01); *H04W 36/0072* (2013.01); *H04W 40/02* (2013.01); *H04W 40/34* (2013.01); *H04W 52/00* (2013.01); *H04W 52/0209* (2013.01); *H04W 52/0212* (2013.01); *H04W 52/0216* (2013.01); *H04W 52/0229* (2013.01); *H04W 64/003* (2013.01); *H04W 72/005* (2013.01); *H04W 72/04* (2013.01); *H04W 72/042* (2013.01); *H04W 72/044* (2013.01); *H04W 72/0406* (2013.01); *H04W 72/0413* (2013.01); *H04W 72/0446* (2013.01); *H04W 74/0816* (2013.01); *H04W 76/02* (2013.01); *H04W 76/021* (2013.01); *H04W 76/023* (2013.01); *H04W 76/025* (2013.01); *H04W 76/026* (2013.01); *H04W 76/048* (2013.01); *H04W 88/06* (2013.01); *H04W 16/28* (2013.01); *H04W 36/14* (2013.01); *H04W 52/0258* (2013.01); *H04W 88/12* (2013.01); *H04W 92/18* (2013.01); *Y02B 60/50* (2013.01)

(56) References Cited

U.S. PATENT DOCUMENTS

| | | | |
|---|---|---|---|
| 8,775,944 B2 * | 7/2014 | Hayton | G06F 21/6218 709/225 |
| 8,909,265 B2 | 12/2014 | Xu et al. | |
| 8,973,088 B1 * | 3/2015 | Leung | H04L 63/00 726/1 |
| 8,989,729 B2 | 3/2015 | Barclay et al. | |
| 9,125,076 B2 | 9/2015 | Lehane | |
| 9,301,083 B2 | 3/2016 | Jain | |
| 9,363,702 B2 | 6/2016 | He et al. | |
| 2008/0052769 A1 | 2/2008 | Leone et al. | |
| 2009/0016232 A1 | 1/2009 | Kwon et al. | |
| 2009/0207817 A1 * | 8/2009 | Montemurro | G06F 9/5011 370/338 |
| 2010/0009675 A1 | 1/2010 | Wijting et al. | |
| 2010/0009690 A1 | 1/2010 | Jin et al. | |
| 2010/0026802 A1 * | 2/2010 | Titus | G08B 13/19608 348/143 |
| 2011/0188376 A1 * | 8/2011 | Stupar | H04L 12/5692 370/235 |
| 2011/0256894 A1 * | 10/2011 | Khandelia | H04W 36/0083 455/507 |
| 2011/0268006 A1 | 11/2011 | Koskela et al. | |
| 2011/0280155 A1 | 11/2011 | Shi | |
| 2011/0317559 A1 * | 12/2011 | Kern | H04L 45/02 370/235 |
| 2011/0317571 A1 * | 12/2011 | Kokkinen | H04W 24/00 370/252 |
| 2012/0057476 A1 | 3/2012 | Chan et al. | |
| 2012/0106517 A1 | 5/2012 | Charbit et al. | |
| 2012/0188949 A1 | 7/2012 | Salkintzis et al. | |
| 2012/0190331 A1 | 7/2012 | Ahmed et al. | |
| 2012/0198233 A1 | 8/2012 | George et al. | |
| 2012/0202508 A1 | 8/2012 | Toth et al. | |
| 2012/0252481 A1 | 10/2012 | Anpat et al. | |
| 2012/0309447 A1 * | 12/2012 | Mustajarvi | H04W 48/18 455/524 |
| 2013/0021968 A1 * | 1/2013 | Reznik | H04W 36/026 370/328 |
| 2013/0083653 A1 | 4/2013 | Jain et al. | |
| 2013/0115983 A1 | 5/2013 | Rönneke et al. | |
| 2013/0115993 A1 | 5/2013 | Jain et al. | |
| 2013/0155948 A1 | 6/2013 | Pinheiro et al. | |
| 2013/0155954 A1 | 6/2013 | Wang et al. | |
| 2013/0170351 A1 * | 7/2013 | Reznik | H04W 28/10 370/235 |
| 2013/0182607 A1 | 7/2013 | Kim et al. | |
| 2013/0223352 A1 | 8/2013 | Sartori et al. | |
| 2013/0223356 A1 | 8/2013 | Khoshnevis et al. | |
| 2013/0273855 A1 | 10/2013 | Cherian et al. | |
| 2013/0279372 A1 | 10/2013 | Jain et al. | |
| 2013/0288732 A1 | 10/2013 | Beale | |
| 2014/0004867 A1 | 1/2014 | Noh et al. | |
| 2014/0011505 A1 | 1/2014 | Liao | |
| 2014/0022898 A1 * | 1/2014 | Kim | H04W 8/22 370/230 |
| 2014/0025804 A1 * | 1/2014 | Mongazon-Cazavet | H04L 41/0893 709/223 |
| 2014/0029530 A1 | 1/2014 | Kim et al. | |
| 2014/0036774 A1 | 2/2014 | Lehane et al. | |
| 2014/0038549 A1 | 2/2014 | Lehane et al. | |
| 2014/0040504 A1 * | 2/2014 | Gupta | H04W 24/04 709/244 |
| 2014/0050160 A1 | 2/2014 | Ronneke et al. | |
| 2014/0086144 A1 | 3/2014 | Foti et al. | |
| 2014/0092808 A1 | 4/2014 | Jain et al. | |
| 2014/0112251 A1 | 4/2014 | Kim et al. | |

(56) References Cited

U.S. PATENT DOCUMENTS

| | | |
|---|---|---|
| 2014/0113609 A1 | 4/2014 | Elloumi et al. |
| 2014/0134996 A1 | 5/2014 | Barclay et al. |
| 2014/0177583 A1 | 6/2014 | Aso et al. |
| 2014/0269779 A1 | 9/2014 | Shan et al. |
| 2014/0286162 A1 | 9/2014 | Kim et al. |
| 2014/0307632 A1 | 10/2014 | Kim et al. |
| 2015/0023164 A1 | 1/2015 | Starsinic et al. |
| 2015/0036672 A1* | 2/2015 | Kim .................. H04W 48/08 370/338 |
| 2015/0172909 A1 | 6/2015 | Chandramouli et al. |
| 2015/0208450 A1 | 7/2015 | Mademann et al. |
| 2015/0271623 A1 | 9/2015 | Kim et al. |
| 2016/0007390 A1 | 1/2016 | Starsinic et al. |

FOREIGN PATENT DOCUMENTS

| | | |
|---|---|---|
| CN | 102612067 A | 7/2012 |
| CN | 103582066 A | 2/2014 |
| CN | 104471876 A | 3/2015 |
| EP | 2421306 A1 | 2/2012 |
| ES | 2439623 A2 | 1/2014 |
| ES | 2440391 A2 | 1/2014 |
| ES | 2439623 R1 | 3/2014 |
| ES | 2440391 R1 | 3/2014 |
| ES | 2447215 A2 | 3/2014 |
| ES | 2473415 A2 | 7/2014 |
| ES | 2473415 R1 | 11/2014 |
| ES | 2447215 R1 | 1/2015 |
| FI | 125701 B | 1/2016 |
| FR | 2994361 A1 | 2/2014 |
| HK | 1207751 A1 | 2/2016 |
| KR | 1020120070444 A | 6/2012 |
| KR | 101637136 B1 | 6/2016 |
| RU | 2322764 C1 | 4/2008 |
| RU | 2352980 C2 | 4/2009 |
| TW | 201419898 A | 5/2014 |
| WO | WO-0163946 A1 | 8/2001 |
| WO | WO-2010028690 A1 | 3/2010 |
| WO | WO-2010080966 A1 | 7/2010 |
| WO | WO-2010130870 A1 | 11/2010 |
| WO | WO-2011088406 A1 | 7/2011 |
| WO | WO-2011160682 A1 | 12/2011 |
| WO | WO-2012056209 A1 | 5/2012 |
| WO | WO-2012066189 A1 | 5/2012 |
| WO | WO-2012068731 A1 | 5/2012 |
| WO | WO-2012092935 A1 | 7/2012 |
| WO | WO-2013022219 A1 | 2/2013 |
| WO | WO-2013185841 A1 | 12/2013 |
| WO | WO-2014021989 A1 | 2/2014 |
| WO | WO-2014022776 A1 | 2/2014 |
| WO | WO-2014022797 A1 | 2/2014 |

OTHER PUBLICATIONS

"C1-122989", 3GPP TSG-CT WG1 Meeting #79, (Aug. 6, 2012), 14 pgs.
"C1-123455", 3GPP TSG-CT WG1 Meeting #79, Revision of C1-123435, C1-123079, C1-122886, (Aug. 6, 2012), 97 pgs.
"C1-123965", 3GPP TSG-CT WG1 Meeting #80, (Oct. 2012), 15 pgs.
Levy, Joseph, et al., "WLAN and Cellular Interworking and Discovery Use Case", IEEE 11-12/0346r0, (Mar. 9, 2012), 11 pgs.
"U.S. Appl. No. 14/124,984, Preliminary Amendment filed Dec. 9, 2013", 11 pgs.
"U.S. Appl. No. 14/126,983, Preliminary Amendment filed Dec. 17, 2013", 8 pgs.
"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.
"International Application Serial No. PCT/US2013/053428, International Search Report mailed Dec. 19, 2013", 4 pgs.
"International Application Serial No. PCT/US2013/053428, Written Opinion mailed Dec. 19, 2013", 8 pgs.
"International Application Serial No. PCT/US2013/053470, International Search Report mailed Nov. 21, 2013", 3 pgs.
"International Application Serial No. PCT/US2013/053470, Written Opinion mailed Nov. 21, 2013", 4 pgs.
Ericson, Juniper, et al., "Device triggering procedure", 3GPP TSG-CT WG3 Meeting #69. C3-120956., [Online] retrieved from the internet: <http://v9ww.3gpp.org/ftp/tsg_ct/WG3_interworking_ex-CN3/TSGC3_69JKyoto/Docs/>, (May 21, 2012), 4 pgs.
"International Application Serial No. PCT/US2013/044530, International Search Report mailed Sep. 4, 2013", 3 pgs.
"International Application Serial No. PCT/US2013/044530, Written Opinion mailed Sep. 4, 2013", 7 pgs.
"3rd Generation Partnership Project; Technical Specification Group Core Network and Terminals; Access Network Discovery and Selection Function (ANDSF) Management Object (MO) (Release 11)", 3GPP TS 24.312 V11.3.0, (2012).
"3rd Generation Partnership Project; Technical Specification Group Services and System Aspects; Data Identification in Access Network Discovery and Selection Function (ANDSF) (DIDA) (Release 11)", 3GPP TR 23.855 V11.0.0, (2012).
"Application-ID", Qualcomm Incorporated, C1-122886, Change Request 24.312 CR 0098 rev—Current Version: 11.3.0 3GPP TSG-CT WG 1 Meeting #79, (2012), 1-14.
"Discussion on OS type leaf", Qualcomm Incorporated, C1-122076, 3GPP TSG CT WG1 Meeting #78, (May 2012).
"Netherlands Application Serial No. 2011259, Search Report mailed Jun. 13, 2014", 2 pgs.
"Netherlands Application Serial No. 2011259, Written Opinion mailed Jun. 13, 2014", 8 pgs.
Mobility, Motorola, et al., "Conclusions for Traffic Identification based on Application", (Nov. 2011).
"Access Network Discovery and Selection Function (ANDSF) Management Object", Universal Mobile Telecommunications System (UMTS); LTE;, (Jul. 2012), 72-155.
"International Application Serial No. PCT/US2013/044530, International Preliminary Report on Patentability mailed Feb. 12, 2015", 9 pgs.
"International Application Serial No. PCT/US2013/053428, International Preliminary Report on Patentability mailed Feb. 12, 2015", 10 pgs.
"International Application Serial No. PCT/US2013/053470, International Preliminary Report on Patentability mailed Feb. 12, 2015", 6 pgs.
"Spanish Application Serial No. 201331212, Office Action mailed Mar. 2, 2015", W/ English References, 1 pg.
"Spanish Application Serial No. 201331212, Search Report mailed Oct. 27, 2014", W/ English References, 4 pgs.
"Spanish Application Serial No. 201331212, Written Opinion mailed Oct. 27, 2014", W/ English Translation, 10 pgs.
"Sweden Application Serial No. 1350932-8, Office Action mailed Jan. 21, 2015", W/ English Translation, 5 pgs.
"Taiwanese Application Serial No. 102127618, Office Action mailed Dec. 1, 2014", W/ English Translation, 20 pgs.
"Taiwanese Application Serial No. 102127618, Response filed Mar. 2, 2015 to Office Action mailed Dec. 1, 2014", W/ English Claims, 10 pgs.
"3rd Generation Partnership Project; Technical Specification Group Core Network and Terminals; Access Network Discovery and Selection Function (ANDSF) Management Object (MO) (Release 11)", ETSI TS 24.312 Version 11.6.0, (Mar. 15, 2013).
"3rd Generation Partnership Project; Technical Specification Group Core Network and Terminals; Access Network Discovery and Selection Function (ANDSF) Management Object (MO) (Release 11)", ETSI TS 24.312 Version 11.3.0, (Jun. 27, 2012).
"Finland Application Serial No. 20135806, Office Action mailed Aug. 15, 2014", 7 pgs.
"3rd Generation Partnership Project; Technical Specification Group Core Network and Terminals; Access Network Discovery and Selection Function (ANDBF) Management Object (MO) (Release 11)", 3GPP, 3GPP Draft; DRAPT_24312-B30,3rd Generation Part-

(56) References Cited

OTHER PUBLICATIONS nership Project.(3GPP), Mobile Competence Centre ; 650, Route Des Lucioles ; M&921 Sophia Antiroub Cedex; France, (Jun. 15, 2015).
"U.S. Appl. No. 14/126,983, Non Final Office Action mailed Jun. 3, 2015", 10 pgs.
"U.S. Appl. No. 14/126,983, Response filed Sep. 3, 2015 to Non Final Office Action mailed Jun. 3, 2015", 9 pgs.
"Application-ID, C1-122866, Change Request 24,312 CR 0098 rev—Current version: 11.3.0 3GPP TSG-CT WG1 Meeting #79", Qualcomm: Incorporated, Chicago (USA), [Online] retrieved from the internet: <URL:http://www.3gpp.org/ftp/tsg_ct/WG1_mm-cc-sm_ex-CN1/TSGC1_79_Chicago//docs>, (Jul. 30, 2012), 1-15.
"Australian Application Serial No. 2013297042, Non Final Office Action mailed Jun. 3, 2015", 3 pgs.
"Belgium Application Serial No. 2013/0522, Office Action mailed May 11, 2015", W/ English Search Report, 12 pgs.
"Spanish Application Serial No. 201331212, Office Action mailed Jul. 14, 2015", W/ English Translation, 8 pgs.
"Australian Application Serial No. 2013297042, Response filed Oct. 2, 2015 to Office Action mailed Jun. 3, 2015", 11 pgs.
"Finland Application Serial No. 20135806, Office Action mailed Sep. 22, 2015", 43 pgs.
"Japanese Application Serial No. 2015-523086, Office Action mailed Sep. 8, 2015", W/ English Translation, 9 pgs.
"Spanish Application Serial No. 201331212, Response filed Feb. 24, 2015 to Office Action mailed Jul. 14, 2015", 10 pgs.
"Spanish Application Serial No. 201331212, Response filed Nov. 9, 2015 to Office Action mailed Jul. 14, 2015", W/ English Claims, 17 pgs.
Qualcomm Incorporated, et al., "Operating System definition for DIDA", 3GPP TSG-CT WG1 Meeting #81, 3GPP, C1-125017, (Nov. 19, 2012).
"[Draft] LS on Tsp", TSG-CT-WG3: 3GPP Draft; C3-121281_LS_ON_TSP-Draft, 3rd Generation Partnership Project (3GPP), Mobile Competence Centre; 650, Route Des Lucioles ; F-06921 Sophia-Antipolis Cedex; France, vol. CT WG3, no. Kyoto, Japan; 20120521-20120525, (May 29, 2012), 2 pgs.
"3rd Generation Partnership Project; Technical Specification Group Core Network and Terminals; Tsp interface protocol between the MTC Interworking Function (MTC-IWF) and Service Capability Server (SCS) (Release 11)", 3GPP Standard; 3GPP TS 29.368, 3rd Generation 3GPP Standard; 3GPP TS 29.368, 3rd Generation; 650, Route Des Lucioles ; F-06921 Sophia-Antipolis Cedex; France, vol. CT WG1, No. V1.0.0,, (Jun. 6, 2012), 1-17.
"3rd Generation Partnership Project; Technical Specification Group Services and System Aspects; Architecture enhancements to facilitate Communications with packet data networks and applications (Release 11)", 3gpp Draft; 23682-010-Cl, 3rd Generationpartnership Project (3GPP), Mobile Competence Centre ; 650, Route Des Lucioles ; F-06921 Sophia-Antipolis Cedex ; France, (Jul. 6, 2012), 27 pgs.
"Access Network Discovery and Selection Function (ANDSF) Management Object (MO)", ETSI TS 124 312 V11.4.0 (3GPP TS 24.312 version 11.4.0 Release 11). Universal Mobile Telecommunications System (UMTS). LTE., (Oct. 2012), 170 pgs.
"Access to the 3GPP Evolved Packet Core (EPC) via non-3GPP access networks; Stage 3", ETSI TS 124 302 V11.4.0 (3GPP TS 24.302 version 11.4.0 Release 11). Universal Mobile Telecommunications System (UMTS), LTE., (Oct. 2012), 64 pgs.
"U.S. Appl. No. 14/124,984, Non Final Office Action mailed May 5, 2016", 20 pgs.
"U.S. Appl. No. 14/126,983, Examiner Interview Summary mailed Jan. 15, 2016", 3 pgs.
"U.S. Appl. No. 14/126,983, Final Office Action mailed Nov. 19, 2015", 9 pgs.
"U.S. Appl. No. 14/126,983, Notice of Allowance mailed Feb. 4, 2016", 5 pgs.
"U.S. Appl. No. 14/126,983, Response filed Jan. 19, 2016 to Final Office Action mailed Nov. 19, 2015", 7 pgs.
"U.S. Appl. No. 14/126,983, Supplemental Notice of Allowability mailed Feb. 19, 2016", 2 pgs.
"U.S. Appl. No. 14/126,983, Supplemental Notice of Allowability mailed Mar. 31, 2016", 2 pgs.
"U.S. Appl. No. 14/126,983, Supplemental Notice of Allowability mailed Apr. 12, 2016", 2 pgs.
"Canadian Application Serial No. 2,878,215, Office Action mailed Feb. 25, 2016", 5 pgs.
"Chinese Application Serial No. 201310435389.8, Office Action mailed Feb. 1, 2016", W/ English Translation, 6 pgs.
"Chinese Application Serial No. 201310435389.8, Response filed Jun. 12, 2016 to Office Action mailed Feb. 1, 2016", w/ English Claims, 31 pgs.
"Discussion paper on DIDA operative System leaf", 3GPP Draft; C1-122885-Dida-Disc-Operating-System-V1, 3rd Generation Partnership Project (3GPP), Mobile Competence Centre ; 650, Route Des Lucioles ; F-06921 Sophia-Antipolis Cedex ; France, (Jul. 30, 2012).
"European Application Serial No. 09832221.7, Extended European Search Report mailed Mar. 31, 2016", 10 pgs.
"European Application Serial No. 13825698.7, Extended European Search Report mailed Mar. 15, 2016", 9 pgs.
"European Application Serial No. 13826192.0, Extended European Search Report mailed Jun. 22, 2016", 9 pgs.
"European Application Serial No. 13826192.0, Partial Supplementary European Search Report mailed Feb. 8, 2016", 7 pgs.
"Finland Application Serial No. 20135806, Response filed Dec. 15, 2014 to Office Action mailed Aug. 15, 2014", With English translation of claims, 6 pgs.
"Finland Application Serial No. 20135806, Response filed Dec. 22, 2015 to Office Action mailed Sep. 22, 2015", W/ English Claims, 5 pgs.
"France Application Serial No. 1357654, Office Action mailed Apr. 1, 2016", With English Translation, 8 pgs.
"French Application Serial No. 1357654, Response filed Jul. 1, 2016 to Office Action mailed Apr. 1, 2016", w/ concise explanation of relevance, 12 pgs.
"Korean Application Serial No. 10-2015-7000081, Office Action mailed Dec. 28, 2015", W/ English Translation, 5 pgs.
"Korean Application Serial No. 10-2015-7000081, Response filed Feb. 12, 2016 to Office Action mailed Dec. 28, 2015", W/ English Translation, 9 pgs.
"Russian Application Serial No. 2014153568, Office Action mailed Feb. 29, 2016", W/ English Translation, 10 pgs.
"Russian Application Serial No. 2014153568, Response filed May 29, 2016 to Office Action mailed Feb. 29, 2016", w/ concise explanation of relevance, 8 pgs.
"Spanish Application Serial No. 201331212, Office Action mailed Dec. 28, 2015", W/ English Translation, 8 pgs.
"Spanish Application Serial No. 201331212, Response filed Mar. 18, 2016 to Office Action mailed Dec. 28, 2015", w/ concise explanation of relevance, 16 pgs.
Doppler, Klaus, et al., "Device-to-Device Communication as an Underlay to LTE-Advanced Networks", IEEE Communications Magazine, 47(12), (Dec. 2009), 42-49.
Canadian Application Serial No. 2,878,215, Response filed Aug. 22, 2016 to Office Action mailed Feb. 25, 2016, 15 pgs.
Swedish Application Serial No. 1350932-8, Response filed to May 21, 2015 to Office Action mailed Jan. 21, 2015, W/ Machine Translation of Argument.
Korean Application Serial No. 10-2016-7013894, Office Action mailed Jul. 28, 2016, W/ English Translation, 9 pgs.
"3GPP ANDSF MO", 3GPP TS 24.312 V11.5.0, (Dec. 19, 2012), 9-21, 54-76.
Chinese Application Serial No. 201310435389.8, Office Action mailed Oct. 17, 2016, W/ Machine Translation, 11 pgs.

\* cited by examiner

US 9,526,022 B2

ESTABLISHING OPERATING SYSTEM AND APPLICATION-BASED ROUTING POLICIES IN MULTI-MODE USER EQUIPMENT

PRIORITY APPLICATION

This application claims priority to U.S. Provisional Patent Application Ser. No. 61/679,627, filed on Aug. 3, 2012, which is hereby incorporated by reference in its entirety.

TECHNICAL FIELD

Embodiments pertain to operations and communications performed by communicating devices in wireless networks. Some embodiments relate to device information and routing policies established for data communications facilitated by a wireless network.

BACKGROUND

Carrier-based wireless communication networks, such as networks operating according to a standard from the 3GPP Long Term Evolution/Long Term Evolution-Advanced (LTE/LTE-A) standards family, deploy mechanisms to assist the discovery and management of network policies. In LTE/LTE-A networks, one such technique involves the use of Access Network Discovery Function (ANDSF) rules and policies within an evolved packet core (EPC) of the LTE/LTE-A system architecture. For example, ANDSF rules and policies may be specified for multi-mode user equipment (UEs) to discover non-3GPP access networks, and assist multi-mode UEs to establish a connection to a Wi-Fi wireless local area network (WLAN) (e.g., a network operating according to an IEEE 802.11 standard) or a WiMax wireless wide area network (e.g., a network operating according to an IEEE 802.16 standard). However, existing policies do not address application-specific requirements or device-specific capabilities.

DETAILED DESCRIPTION

Figure 1:
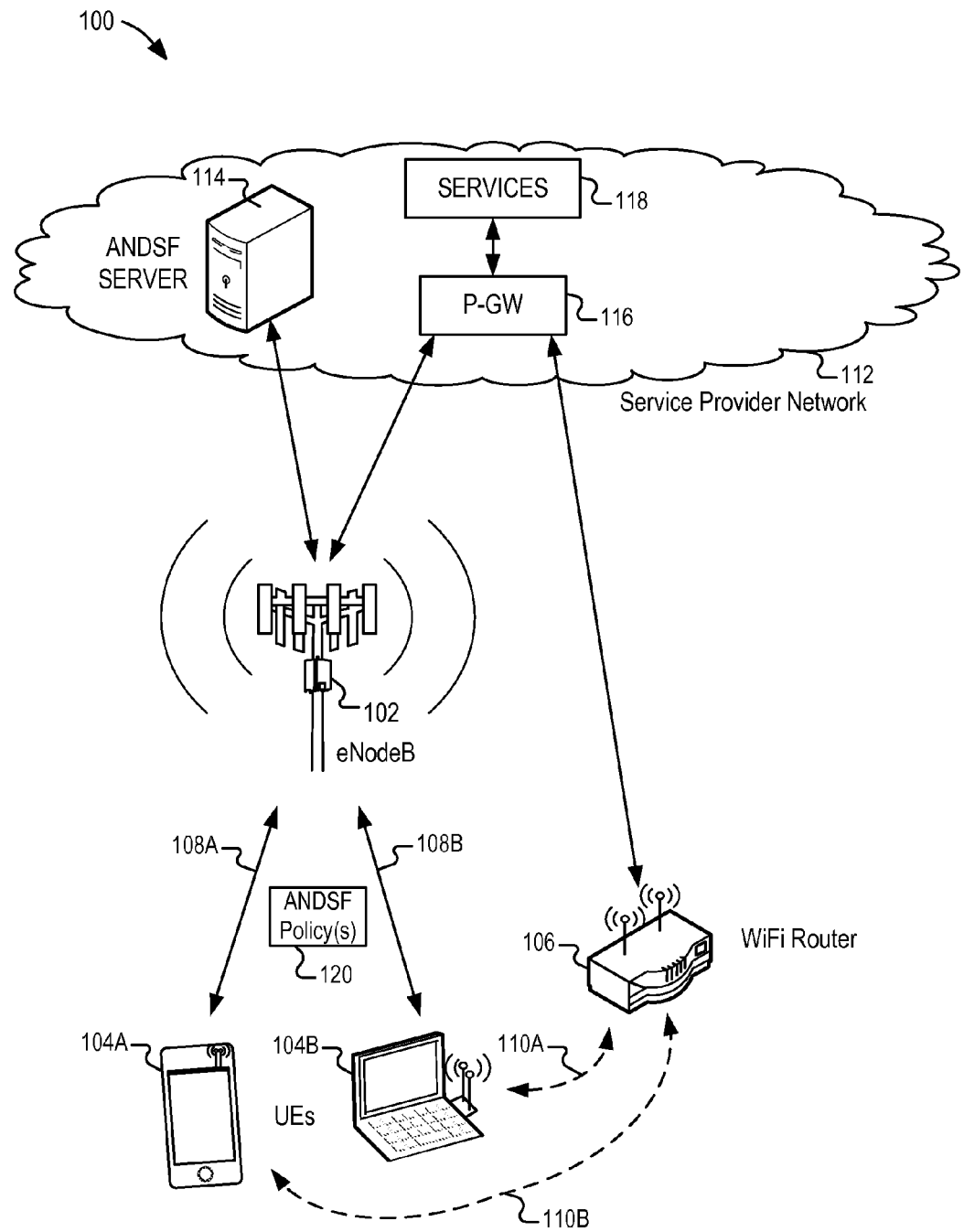
FIG. 1 illustrates a configuration of a mixed-mode communication network architecture according to a further described example.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein enable the creation and operation of ANDSF-based policies that may be deployed to address specific device/network implementations and offloading use cases. The information factored within ANDSF policies may include application- and device-specific configurations, including device type, hardware version, operating system type and version, software application type and version, and like UE configuration details. These UE configuration details may be used to establish and deploy a specific inter-system routing policy (ISRP) for control of traffic routing and mobility among the applications installed within the UE.

In an LTE/LTE-A system configuration, an ANDSF server may provide: an inter-system mobility policy used for assisting handover decisions; an ISRP for routing IP traffic simultaneously over multiple radio access interfaces; and discovery information for indicating non-3GPP access networks that may be available in the vicinity of the UE to assist the UE in connecting to such networks. Several different policies can be specified as part of ISRP for IP Flow Mobility offloading techniques.

As an example of traffic routing and mobility, certain applications capable of communication over multiple wireless network interfaces in a multi-mode user equipment (such as WLAN and Cellular) may choose to route all traffic over one interface (WLAN) versus another. ANDSF-based policies are controlled by a carrier network operator and are intended to compliment such scenarios, with rule-based management of network offloading. ANDSF mechanisms may be used to deliver policies and policy information to UEs on behalf of operators for a variety of reasons and situations, such as managing offloading and network access at certain times of day, in certain areas, or for certain flows.

However, current ANDSF-based policies do not provide mechanisms to adequately address application-specific preferences and policies. For example, a video-based application may choose use of a WLAN connection, whereas a voice application may choose use of a cellular connection. Further, the preferences and policies used to perform offloading may be dependent on the particular version or configuration of the UE, and whether flow-based or non-seamless offloading is desired or allowed for particular applications.

In one example, various Data Identification fields are proposed for use with the ANDSF management object (MO), including the addition of various Application Identifiers at the ANDSF server to allow an ISRP to support traffic identification based on an application identity. Current updates to ISRP enable the increased use and handling of application identity as an identification of IP traffic. Relevant information used to determine an appropriate application identity not only includes the particular application version or application configuration, but also related fields including the UE version, UE platform and hardware configuration, UE operating system, and the like. The presently described data configurations and exchange mechanisms therefore enable the communication of a detailed application identity and associated data handling policies and procedures.

FIG. 1 provides an illustration of an example configuration of a mixed-mode communication network architecture 100. Within the network architecture 100, a carrier-based network (e.g., a LTE/LTE-A cell network operating according to a standard from a 3GPP standards family) is established by a carrier-based network system 102 (e.g., an evolved NodeB (eNodeB) establishing a cellular network) communicating with multi-mode mobile devices (UEs) 104A, 104B. A local area-based network system 106 (e.g., a WiFi network operating according to a standard from an IEEE 802.11 standards family) may be established by local network equipment including a WiFi router or access point. The carrier-based network includes network connections 108A, 108B to the mobile devices 104A, 104B, respectively; and the local-area based network includes network connections 110A, 110B to the mobile devices 104A, 104B respectively. The mobile devices 104A, 104B are illustrated as conforming to different form factors, including a smartphone (mobile device 104A) and a personal computer (mobile device 104B) having an integrated or external wireless network communication device, although it will be understood that the same or other form factors may be used.

Wireless network communication connections 108A, 108B, 110A, 110B among the various mobile devices 104A, 104B may be facilitated using either the carrier-based network system 102 or the local area-based network system 106 in connection with the deployment of various offloading policies and preferences. The offloading policies and preferences may be communicating using one or more ANDSF policy(s) 120, communicated from an ANDSF server 114 via the carrier-based network system 102 (and network connections 108A, 108B).

The ANDSF server 114 may be facilitated within a service provider network 112 of the carrier network. The service provider network 112 may include various components of an Evolved Packet Core (EPC) and other components of the 3GPP LTE/LTE-A network, including various services 118 and a P-GW (Packet Data Network (PDN) Gateway) 116. Data traffic offloaded to the local area-based network system 106 may be communicated back to the service provider network 112 through a connection with the P-GW 116. Thus, wireless network communications offloaded to another network architecture (wireless network connections 110A, 110B) may be used to access functionality of the service provider network 112.

Figure 2:
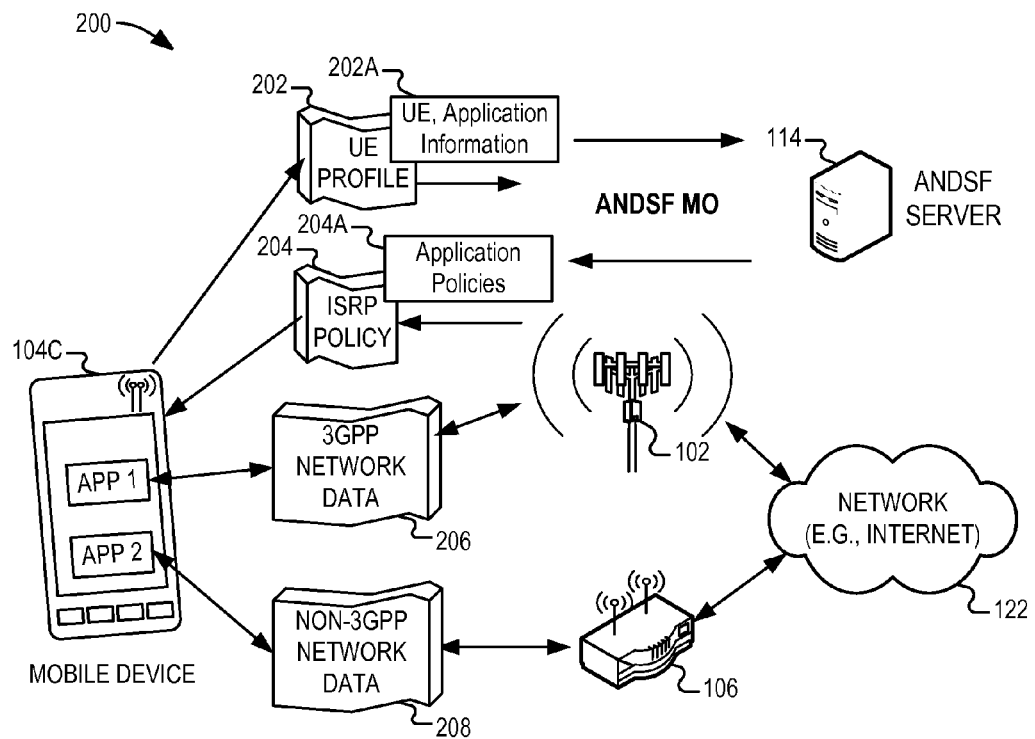
FIG. 2 illustrates data operations with a mixed-mode user equipment device according to a further described example.

FIG. 2 provides an illustration of example data operations 200 with a mixed-mode user equipment device (mobile device 104C) performed in connection with the mixed-mode communication network architecture 100 of FIG. 1. As shown in FIG. 2, the mobile device 104C is configured to perform communications of 3GPP network data 206 with the carrier-based network system 102, to an external network (such as the internet) 122; and the mobile device 104C is also configured to perform communications of non-3GPP network data 208 with the local area network system 106, to the external network 122.

The mobile device 104C is depicted as communicating data with a first software application "App 1" in the 3GPP network data 206, and with a second application "App 2" in the non-3GPP network data 208. The deployment of data from the various software applications to the appropriate network is facilitated in connection with an ISRP policy 204 including one or more application policies 204A provided from the ANDSF server 114. The mobile device 104C is configured to implement the ISRP policy 204 to specify IP flow mobility applications, based on application identifiers (such as an indication of App 1 versus App 2).

The particular application identifiers and set of application policies 204A in the ISRP policy 204 are communicated to the mobile device 104C within an ANDSF MO from the ANDSF server 114 received via the non-offloaded (e.g., 3GPP LTE/LTE-A) network. The ANDSF MO may be structured in an eXtensible Markup Language (XML) format, and may be pulled from or pushed to the mobile device 104C. To determine the appropriate application policies to deploy in the ISRP policy 204, information on the UE and appropriate applications may be communicated to the ANDSF server 114. In one example, a UE profile 202 having appropriate UE and application information 202A is also communicated in the ANDSF MO to the ANDSF server 114.

Use of the application policies 204A in a deployed ISRP policy 204 may be used to address an application's network usage at the UE. The application policies 204A may be customized to a wide variety of network usage cases and scenarios, and include rules for conducting a specific access or set of accesses from an identified application to a chosen network or network type. For example, consider video codec playback in a multimedia playback application. In some scenarios, the UE may play low-quality video that has a preference for being downloaded from a 3GPP access network. If high quality playback in a high definition or higher resolution format is desired, the preference may be to have the application use a Wi-Fi or other secondary wireless network. The application policies 204A may be used to identify the application uniquely, and associate the application with access type rules based on carrier network requirements and preferences.

Figure 3:
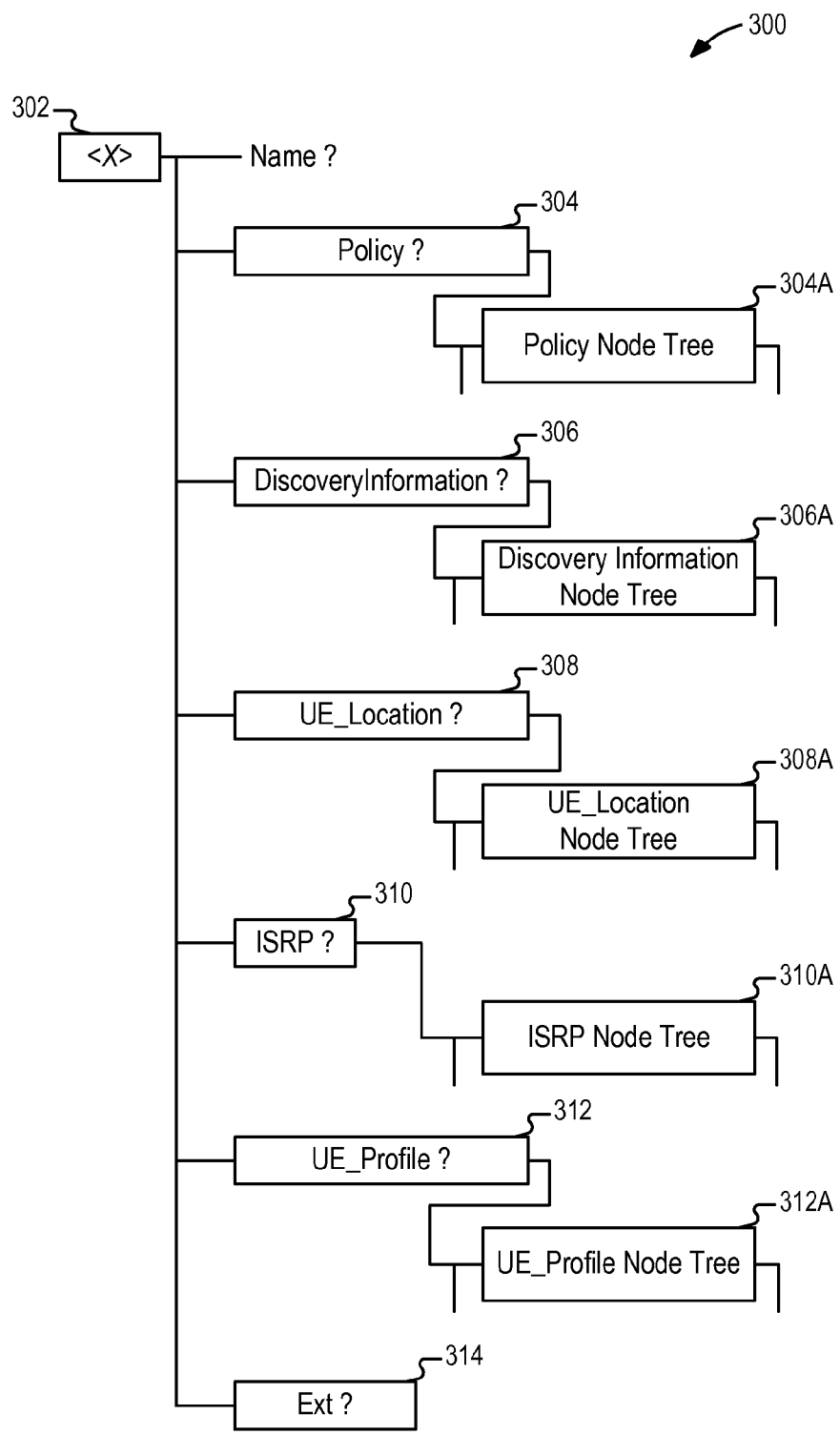
FIG. 3 illustrates an ANDSF management object including a user profile configuration sub-object according to a further described example.

FIG. 3 provides an example illustration 300 of an ANDSF MO formatted structured node object 302, having a series of a structured sub-objects including a user profile configuration sub-object. The structured sub-objects of the structured node object 302 may be defined for compliance with a particular specification (e.g., a 3GPP LTE/LTE-A specification) and may include: a Policy node sub-object 304 defining a policy node tree 304A; a DiscoveryInformation node sub-object 306 defining a discovery information node tree 306A; a UE_Location node sub-object 308 defining a user equipment location node tree 308A; an ISRP node sub-object 310 defining an ISRP node tree 310A; the UE_Profile node sub-object 312 defining a UE_Profile node tree 312A (further illustrated in FIG. 5); and an Ext node sub-object 314 providing a potential definition for vendor specific information.

Figure 4A:
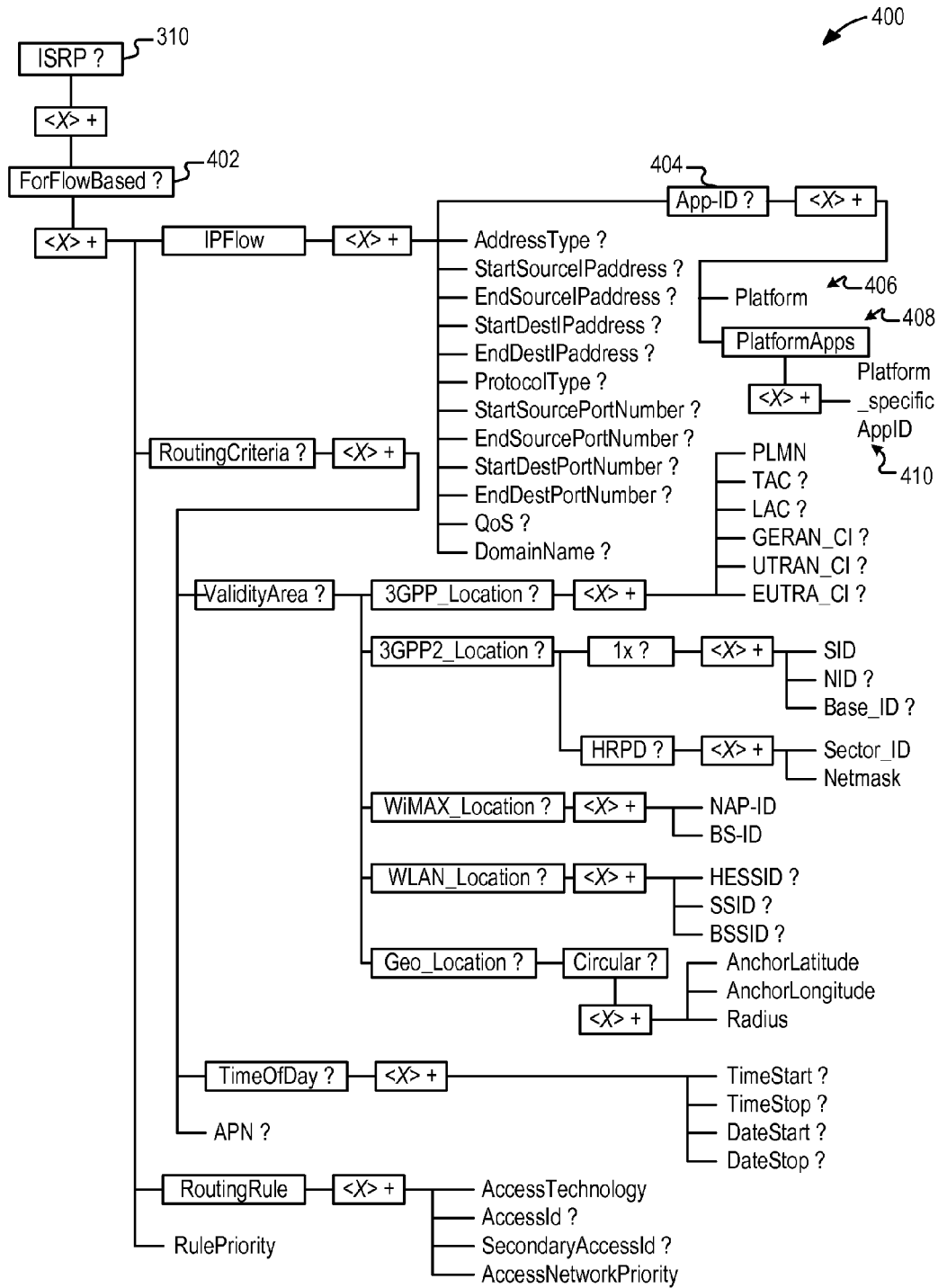
FIG. 4A illustrates an ISRP flow-based policy node of an ANDSF management object including an application-specific configuration according to a further described example.
Figure 4B:
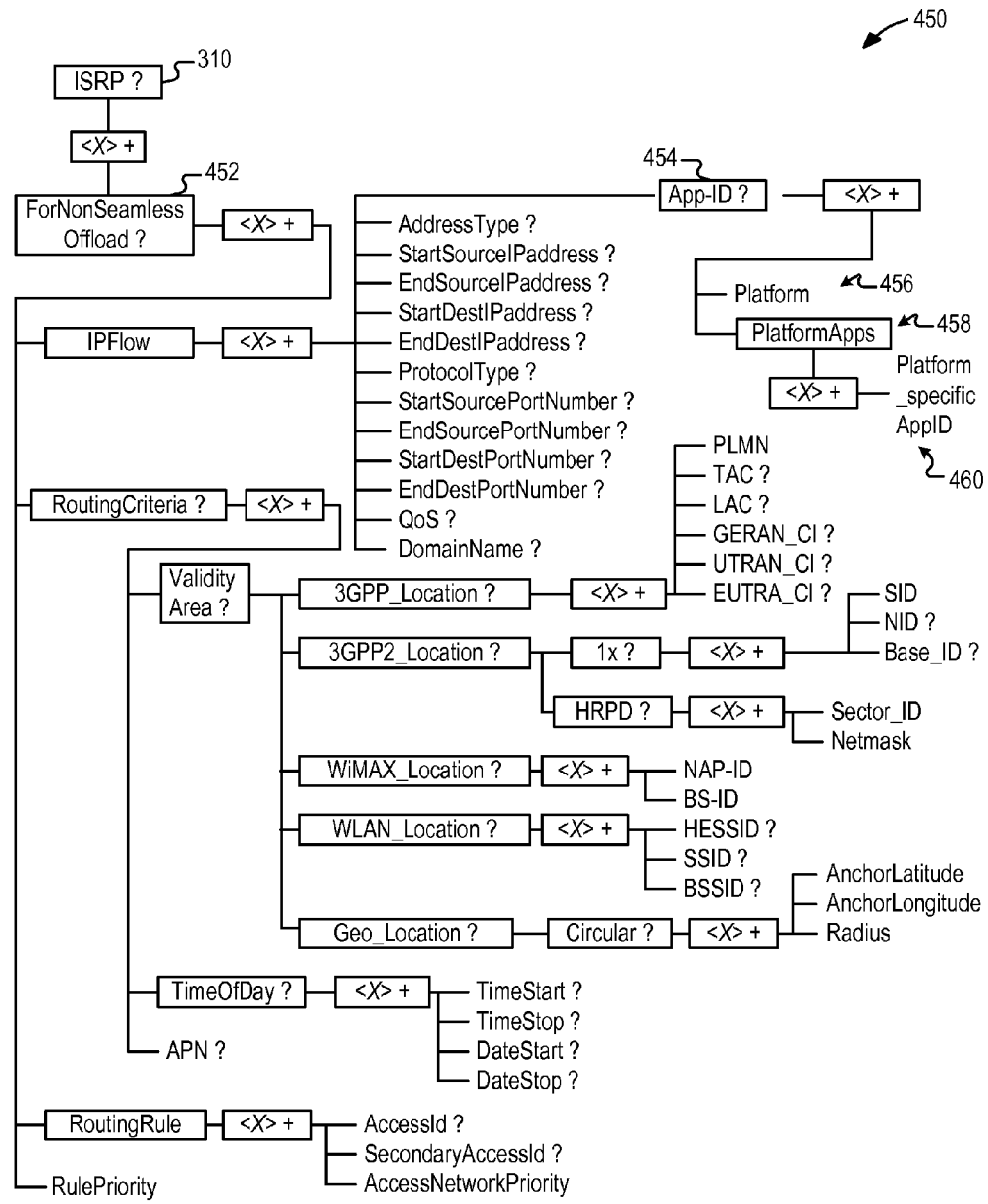
FIG. 4B illustrates an ISRP non-seamless offload-based policy node of an ANDSF management object including an application-specific configuration according to a further described example.

The modification to the ANDSF MO to specify and deploy application-based routing policies may be provided in connection with two aspects: first, a definition in the UE_Profile node tree 312A containing the specific UE hardware configuration, operating system, operating system version information, and other UE operating information; and second, a definition of an ApplicationId leaf, defined for deployment in the ISRP node tree 310A as further described herein (and illustrated in node trees 400, 450 in FIGS. 4A and 4B respectively).

The definition in the UE_Profile node tree 312A may be used to communicate general UE and application operation information, via the ANDSF MO as illustrated in the UE profile 202 communicated in FIG. 2. A node specifying the ApplicationId for specific application policies is used in the ANDSF MO, deployed in an ISRP for both flow-based and for non-seamless-WLAN-offload mechanisms.

FIGS. 4A and 4B provide example illustrations of ISRP policy node structures for an ANDSF management object, for a flow-based policy node tree 400 and a non-seamless offload policy node tree 450 respectively. An ISRP rule set can contain one or more flow distribution containers, including a ForFlowBased node 402 for an IP Flow Mobility and Seamless Offload (IFOM) service as shown in FIG. 4A, and a ForNonSeamlessOffload node 452 for a Non-seamless Offload service as shown in FIG. 4B.

The ISRP node branches specify a mechanism to identify the traffic generated by a specific application. The flow distribution container can have one or more flow distribution rules. In the ForFlowBased node 402 for an IFOM service as shown in FIG. 4A, these distribution rules include traffic distribution rules for UEs in connection with an IFOM offloading mechanism. In the ForNonSeamlessOffload node 452 for the Non-seamless Offload as shown in FIG. 4B, these distribution rules include traffic distribution for UEs in connection with a non-seamless offloading mechanism.

In one example, ISRP nodes are defined for use under the ForFlowBased node 402, in connection with definitions for App-ID node 404, Platform node 406, PlatformApps node 408, and Platform_specificAppID node 410. The definition of these nodes may be provided as follows:

Node: <X>/ISRP/<X>/ForFlowBased/<X>/IPFlow/<X>/App-ID
  This interior node acts as a placeholder for an IPFlow identification mechanism through an application identifier. The absence of this node may be used to indicate that the application identifier is not examined when matching packets against the IP flow description of the rule.
  Occurrence: ZeroOrOne
  Format: node
  Access Types: Get, Replace Node: <X>/ISRP/<X>/ForFlowBased/<X>/IPFlow/<X>/App-ID/<X>/
  This interior node acts as a placeholder for one or more platform configurations supported by the UE based on the information contained in the UE_Profile node.
  Occurrence: OneOrMore
  Format: node
  Access Types: Get, Replace Node: <X>/ISRP/<X>/ForFlowBased/<X>/IPFlow/<X>/App-ID/<X>/Platform
  The Platform leaf indicates the platform that is associated with the application identifier contained in the corresponding Platform_specificAppID leaf.
  Occurrence: One
  Format: chr
  Access Types: Get, Replace
  Values: <Platform>
  The value of the Platform identifier is a string that specifies the operating system or execution environment along with the corresponding version information and the hardware architecture of the UE. Further definition may be provided for the format and values of the Platform identifier.

Node: <X>/ISRP/<X>/ForFlowBased/<X>/IPFlow/<X>/App-ID/<X>/PlatformApps/
  This interior node acts as a placeholder for one or more Platform_specificAppID leaf.
  Occurrence: One
  Format: node
  Access Types: Get, Replace Node: <X>/ISRP/<X>/ForFlowBased/<X>/IPFlow/<X>/App-ID/<X>/PlatformApps/<X>
  This interior node acts as a placeholder for one or more Platform_specificAppID leaf(s).
  Occurrence: OneOrMore
  Format: node
  Access Types: Get, Replace Node: <X>/ISRP/<X>/ForFlowBased/<X>/IPFlow/<X>/App-ID/<X>/PlatformApps/<X>/Platform_specificAppID
  The Platform_specificAppID leaf indicates the platform specific application identifier associated with the IP Flow description.
  Occurrence: One
  Format: chr
  Access Types: Get, Replace
  Values: <AppID>
  The value of AppID is a character string associated with a given application. The platform specific application identifier uniquely identifies the application within the UE for the given platform. As an example, the application identifier can take the form com.organization.app-name.

In another example, the ISRP nodes are defined for use under the ForNonSeamlessOffload node 452, in connection with definitions for App-ID node 454, Platform node 456, PlatformApps node 458, and Platform_specificAppID node 460. The definition of these nodes may be provided as follows:

Node: <X>/ISRP/<X>/ForNonSeamlessOffload/<X>/IPFlow/<X>/App-ID
  This interior node acts as a placeholder for an IPFlow identification based through applicationID. The absence of this leaf may be used to indicate that the application identifier is not examined when matching packets against the IP flow description of the rule.
  Occurrence: ZeroOrOne
  Format: node
  Access Types: Get, Replace Node: <X>/ISRP/<X>/ForNonSeamlessOffload/<X>/IPFlow/<X>/App-ID/<X>/
  This interior node acts as a placeholder for one or more platform configurations supported by the UE based on the information contained in the UE_Profile node
  Occurrence: OneOrMore
  Format: node
  Access Types: Get, Replace Node: <X>/ISRP/<X>/ForNonSeamlessOffload/<X>/IPFlow/<X>/Platform
  The Platform leaf indicates the platform that is associated with the application identifier contained in the correspondent Platform_specificAppID leaf.
  Occurrence: One
  Format: chr
  Access Types: Get, Replace
  Values: <Platform>
  The value of the Platform identifier is a string that specifies the operating system or execution environment along with the corresponding version information and the hardware architecture of the UE. Further definition may be provided for the format and values of the Platform identifier.

Node: <X>/ISRP/<X>/ForNonSeamlessOffload/<X>/IP-Flow/<X>/App-ID/<X>/PlatformApps/
  This interior node acts as a placeholder for one or more Platform_specificAppID leaf(s).
    Occurrence: One
    Format: node
    Access Types: Get, Replace
Node: <X>/ISRP/<X>/ForNonSeamlessOffload/<X>/IP-Flow/<X>/PlatformApps/<X>
  This interior node acts as a placeholder for one or more Platform_specificAppID leaf.
    Occurrence: OneOrMore
    Format: node
    Access Types: Get, Replace
Node: <X>/ISRP/<X>/ForNonSeamlessOffload/<X>/IP-Flow/<X>/PlatformApps/<X>/Platform_specificAppID
  The Platform_specificAppID leaf indicates the platform specific application identifier associated with the IP Flow description.
    Occurrence: One
    Format: chr
    Access Types: Get, Replace
    Values: <AppID>
  The value of the AppID identifier may be defined as a character string associated with a given application. The platform specific application identifier uniquely identifies the application within the UE for the given platform. As an example, the application identifier can take the form com.organization.app-name.

Figures 5, 6:
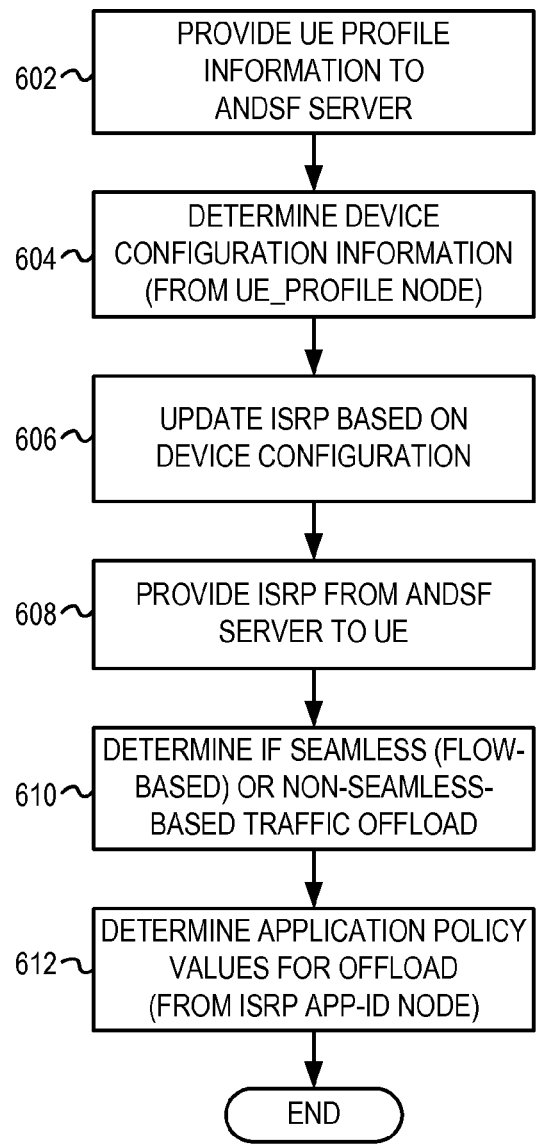
FIG. 5 illustrates a user profile node of an ANDSF management object according to a further described example.
FIG. 6 illustrates a flowchart of an example method for establishing and deploying an application-identifying ANDSF policy according to a further described example.

FIG. 5 provides an example illustration of a user profile node structure 500 (e.g., UE_Profile node 312) communicated to the ANDSF server 114 using an ANDSF MO. The UE_Profile node structure 500 may be arranged to include information characterizing the platform configuration of the UE that can be used by the ANDSF server 114 for information provisioning. The UE_Profile node structure 500 is updated by the UE at an appropriate time, for example after powering on, or prior to establishing a network connection. The ANDSF server 114 is arranged to retrieve information from the UE_Profile node structure 500 after the UE (e.g., mobile device 104C) establishes a connection with the ANDSF server 114. The update of the information contained in these nodes, however, does not necessarily imply any interaction with the ANDSF server.

The UE_Profile node structure 500 is used to define the UE configuration and enable the UE to indicate its configuration to the network. In order to cope with the multiple operating system support requirement, the ANDSF server 114 provides the UE with policies containing the application ID for the corresponding operating system running on the UE and the hardware platform type in order to properly identify the applications. With the UE_Profile node structure 500, the UE provides the ANDSF with the supported operating system and hardware configuration information to inform the ANDSF to obtain or download the policies with the application-ID used by the supported platform, and thus identify the application to which the policy refers.

The UE may support multiple platform configurations. The platform configuration communicated with the ANDSF server 114 may indicate the applicable operating system or execution environment along with the corresponding version information. In one example, the ANDSF server uses the user profile information from the UE_Profile node structure 500 to establish and communicate a particular ISRP (e.g., an ISRP customized to flow-based policy node tree 400 or non-seamless offload policy node tree 450) for use to classify application traffic. The ISRP is used for only those applications that are supported by the UE platform configuration based on the information specified in the UE_Profile node structure 500.

The UE updates the nodes in the UE_Profile node structure 500 so that the ANDSF server 114 can read this information when interacting with the UE. The information in the UE_Profile node structure 500 may be retrieved by the ANDSF server 114 during an Open Mobile Alliance Device Management (OMA-DM) exchange when the server reads the MO of the UE, for example.

As illustrated in FIG. 3, the MO has a node (UE_Profile node 312) indicating the configuration of the UE and including the UE_Profile node structure 500. The UE_Profile node structure 500 specifies in detail the hardware platform of the UE and the operating system or execution environment used by or available to the UE. The update of the information contained in these nodes does not necessarily imply any interaction with the ANDSF server 114. However, the MO enables the ANDSF server 114 to be informed about the hardware configuration of the UE, the operating system and version of the operating system installed on the UE, and other relevant UE profile information. Based on this information, the ANDSF server 114 can generate and provide specific application identifiers corresponding to UE configuration (and thus customize particular ISRP policies to the specific application identifiers).

As a specific example of implementation, the following nodes and leaf objects of the UE_Profile node 312 and the UE_Profile Node Tree 312A may be provided under the ANDSF MO formatted structured node object 302:

Node: <X>/UE_Profile/
  The UE_Profile node acts as a placeholder for describing the platform configuration information of the UE, and used to identify applications and application environments for the specific UE.
    Occurrence: ZeroOrOne
    Format: node
    Access Types: Get
Node: <X>/UE_Profile/<X>
  This interior node acts as a placeholder for one or more platform configurations of the UE.
    Occurrence: OneOrMore
    Format: node
    Access Types: Get
Node: <X>/UE_Profile/<X>/Platform
  The Platform leaf indicates the platform configuration supported by the UE.
    Occurrence: ZeroOrOne
    Format: chr
    Access Types: Get
    Values: <Platform>
  The value of the Platform identifier may include a string that specifies the operating system or execution environment along with the corresponding version information and the hardware architecture of the UE. Further definition of the format and values of the Platform identifier may be provided, to indicate the hardware architecture and operating system or execution environment information to uniquely identify appropriate applications on the UE.

Further specification for the format of the UE_Profile node or the Platform identifier may factor specific hardware, operating system, or software configurations. As an example, the Platform identifier can specify one of the following values:
  Android on x86 on x86-based processors
  Android on ARM on x86-based processors Windows version 8 on x86-based processors
Windows version 8 on ARM-based processors
iOS on ARM-based processors Although the preceding identifier example values are specific to certain device implementations, these example values are provided for illustration purposes and not for limitation. A variety of other device hardware, operating system, and software implementation values may be specified by the Platform identifier or other information in the UE_Profile node structure 500. These may include values specific to configurable, adaptable, or upgradable hardware and software configurations.

In further examples, the ISRP may be configured to manage an update policy used to provide an update of the distribution rules, including updates for profile information for various UEs and UE applications.

Node: <X>/ISRP/<X>/UpdatePolicy
  The UpdatePolicy leaf indicates the update policy for the ISRP. The UpdatePolicy value may be used by the UE to determine whether or not to request an update of its ISRP when the rule is no longer considered to be valid by the UE. The default value 0 applies if this leaf is not provisioned.
  Occurrence: ZeroOrOne
  Format: bool
  Access Types: Get, Replace
  Values: 0,1 (0 indicates that the UE is not required to request an update of the rules; 1 indicates that the UE is required to request an update of the rules).

FIG. 6 provides an example flowchart 600 illustrating a method for establishing and deploying an application-identifying ANDSF policy. As illustrated, flowchart 600 includes a combination of actions performed at the ANDSF server and at the UE. However, it will be apparent that variations to the following overview method may include corresponding actions and techniques performed exclusively at the ANDSF server or the UE.

Flowchart 600 depicts operations for communicating and obtaining the UE profile information, including providing the UE profile information from the UE to the ANDSF server (operation 602) and determining the device configuration information at the ANDSF server from the UE profile information (operation 604). The UE profile information may be communicated in an ANDSF MO object or in other data provided to the ANDSF server prior to deployment of the ISRP policy.

Next, operations for determining the values of the particular ISRP policy include updating the ISRP based on the device configuration information (operation 606), and providing the ISRP from the ANDSF server to the UE (operation 608). The ISRP may be communicated as a node of an ANDSF MO object communicated to the UE. The ISRP may be pushed to or pulled from the ANDSF server or other service of the EPC.

The ISRP is updated to factor the hardware and software configuration of the UE, but may provide multiple types of offload policy values to apply. Determining the appropriate set of policy values in the ISRP may include determining whether a seamless or non-seamless based traffic offloading is occurring (operation 610). Upon selection of the appropriate set of policy values in the ISRP, the application policy values for offloading may be extracted from the ISRP (operation 612) (e.g., from the APP-ID node in the ISRP section specific to seamless or non-seamless-based offloading).

Although the preceding examples were provided with reference to a specific ANDSF server and policy usage in a 3GPP network, it will be understood that the use and deployment of identifying application information for network offloading may be provided in a variety of networks and using other types of deployment mechanisms. For example, non-ANDSF structures may be used to communicate all or portions of the policy information for specific software applications. Further, multi-mode user equipment may include any device capable of communication on the primary carrier network and a secondary offloaded network, including personal computers, notebooks and laptops, smartphones, tablets, mobile hotspots, media players, and the like.

As described herein, various methods or techniques, or certain aspects or portions thereof, may take the form of program code (i.e., instructions) embodied in tangible media, such as flash memory, CD/DVD-ROMs, hard drives, portable storage devices, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
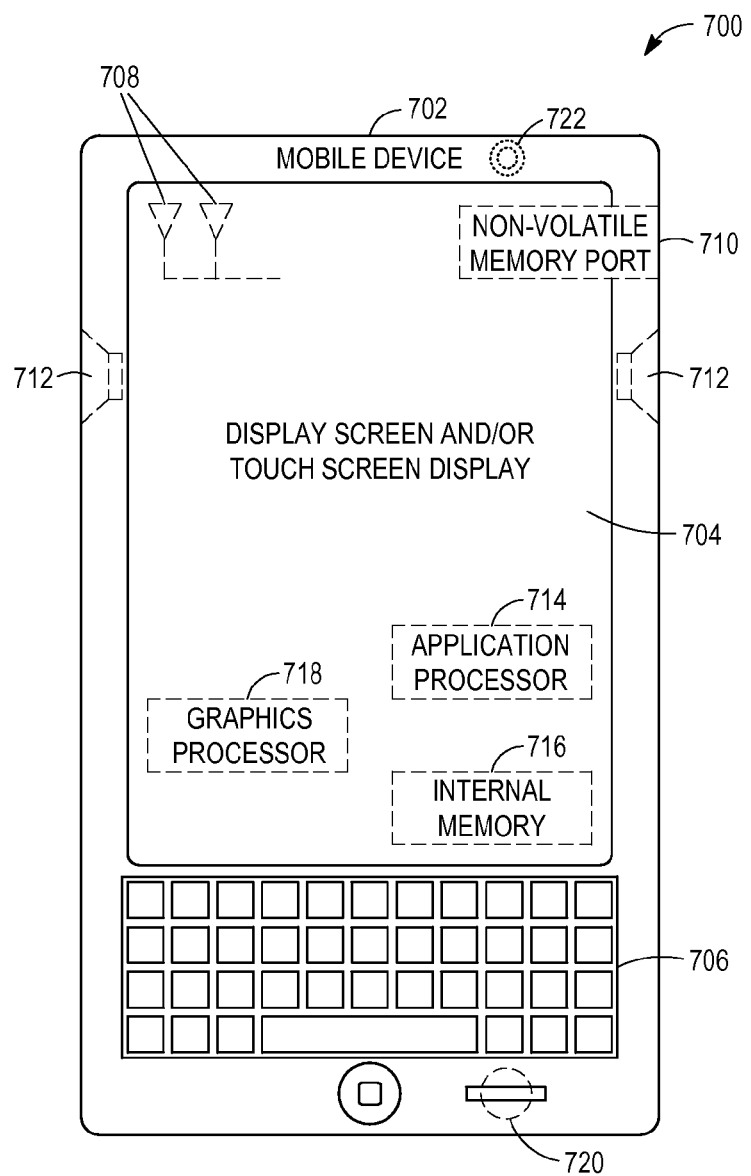
FIG. 7 illustrates an example mobile device on which the configurations and techniques described herein may be deployed.

FIG. 7 provides an example illustration of a mobile device 700, such as a user equipment (UE), a mobile station (MS), a mobile wireless device, a mobile communication device, a tablet, a handset, or other type of mobile wireless device. The mobile device 700 may include one or more antennas 708 configured to communicate with a base station (BS), an eNodeB, or other type of wireless wide area network (WWAN) access point. The mobile device 700 may be configured to communicate using at least one wireless communication standard including 3GPP LTE, WiMAX, High Speed Packet Access (HSPA), Bluetooth, and Wi-Fi. The mobile device 700 may communicate using separate antennas for each wireless communication standard or shared antennas for multiple wireless communication standards. The mobile device 700 may communicate in a WLAN, a wireless personal area network (WPAN), and/or a WWAN.

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen. A camera 722 located on the front (display screen) side or the rear side of the mobile device 700 may also be integrated into the housing of the mobile device 700.

Figure 8:
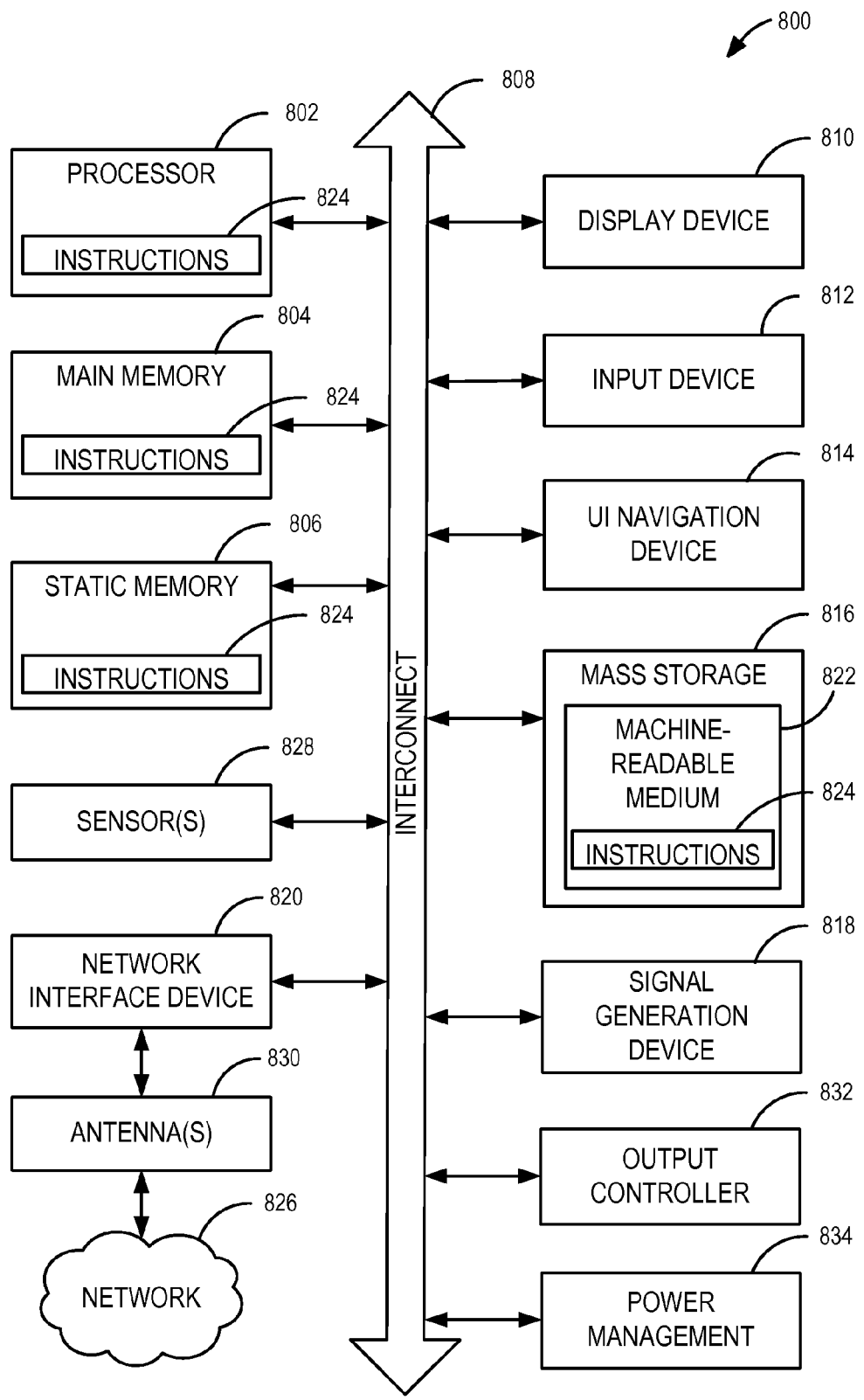
FIG. 8 illustrates an example computer system that may be used as a computing platform for the computing and network communication devices described herein.

FIG. 8 is a block diagram illustrating an example computer system machine upon which any one or more of the methodologies herein discussed may be run. Computer system 800 may be embodied as the mobile devices 104A, 104B, mobile device 700 (from FIGS. 1 and 7), or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), an output controller 832, a power management controller 834, and a network interface device 820 (which may include or operably communicate with one or more antennas 830, transceivers, or other wireless communications hardware), and one or more sensors 828, such as a GPS sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes the subject matter embodied by a method performed at an Access Network Discovery and Selection Function (ANDSF) server, for establishing application-based network routing policies, the method comprising: obtaining user equipment (UE) profile information from a UE profile node in an ANDSF management object, the UE profile information specific to a configuration of a UE; determining an application policy for offloading data to a secondary network for a particular software application operating in the configuration of the UE; defining an application node within an inter-system routing policy (ISRP) node of the ANDSF management object, the application node providing the application policy for offloading data to the secondary network; and providing the ISRP to the UE for implementation of the application policy for offloading data to the secondary network.

In Example 2, the subject matter of Example 1 can optionally include providing the ISRP to the UE for implementation by transmitting the ANDSF management object from the ANDSF server to the UE, wherein the application node includes a first application node defined for a flow-based policy of the ISRP node and a second application node defined for a non-seamless offload-based policy of the ISRP node.

In Example 3, the subject matter of one or any combination of Examples 1-2 can optionally include obtaining UE profile information from a UE profile node in the ANDSF management object by obtaining the ANDSF management object from the UE during an Open Mobile Alliance Device Management (OMA-DM) exchange and reading the UE profile node from the ANDSF management object, and wherein the ANDSF management object is structured in an eXtensible Markup Language (XML) format.

In Example 4, the subject matter of one or any combination of Examples 1-3 can optionally include a new application node included within the ISRP for each application of the UE identified for inclusion in the application policy for offloading data to the secondary network.

In Example 5, the subject matter of one or any combination of Examples 1-4 can optionally include the UE profile information specific to a configuration of a UE including information to identify a plurality of software applications specific to the configuration of the UE.

In Example 6, the subject matter of one or any combination of Examples 1-5 can optionally include the information to identify a plurality of software applications specific to the configuration of the UE indicating one or more of: software version, hardware version, hardware architecture, or operating system.

In Example 7, the subject matter of one or any combination of Examples 1-6 can optionally include the application node including an application identifier, the application identifier used to uniquely identify the particular software application operating in the configuration of the UE.

In Example 8, the subject matter of one or any combination of Examples 1-7 can optionally include the ANDSF server being provided within an Evolved Packet Core operating in accordance with a standard from a 3GPP Long Term Evolution or Long Term Evolution-Advanced (LTE/LTE-A) standards family, and wherein the secondary network is a wireless local area network operating in accordance with a standard from an IEEE 802.11 standards family.

Example 9 can include, or can optionally be combined with all or portions of the subject matter of one or any combination of Examples 1-8 to include the subject matter embodied by a multi-mode user equipment (UE) device, comprising a transceiver arranged to perform communications with a carrier-based wireless network and with a wireless local area network; and processing circuitry arranged to implement one or more application-based network routing policies provided from an Access Network Discovery and Selection Function (ANDSF) server maintained within an Evolved Packet Core of the carrier-based wireless network, the processing circuitry arranged to perform one or more instructions to: transmit, to the ANDSF server, UE profile information including a hardware and software configuration of the UE; receive, from the ANDSF server, an application network routing policy for offloading data of a software application arranged for operation on the UE, the application network routing policy included in an inter-system routing policy (ISRP) of an ANDSF management object; and perform offloading of data generated from the software application to the wireless local area network in connection with the ISRP and the application network routing policy for offloading data.

In Example 10, the subject matter of Example 9 can optionally include wherein the UE profile information including information for one or more of: software version, hardware version, hardware architecture, or operating system.

In Example 11, the subject matter of one or any combination of Examples 9-10 can optionally include the application network routing policy including a plurality of nodes for a plurality of software applications arranged for operation on the UE, the plurality of software applications including the software application, and wherein each of the plurality of software applications includes an identifier specific to the particular software application and an operating environment of the particular software application.

In Example 12, the subject matter of one or any combination of Examples 9-11 can optionally include the application network routing policy including a first application network routing policy defined for a flow-based policy of the ISRP, and a second application network routing policy defined for a non-seamless offload-based policy of the ISRP.

In Example 13, the subject matter of one or any combination of Examples 9-12 can optionally include the first application network routing policy and the second application network routing policy each including a node for the software application including a plurality of varying application policies based on the hardware and software configuration of the UE.

In Example 14, the subject matter of one or any combination of Examples 9-13 can optionally include the carrier-based wireless network operating in accordance with a standard from a 3GPP Long Term Evolution or Long Term Evolution-Advanced (LTE/LTE-A) standards family, and wherein the wireless local area network operates in accordance with a standard from an IEEE 802.11 standards family.

Example 15 can include, or can optionally be combined with all or portions of the subject matter of one or any combination of Examples 1-14 to include the subject matter embodied by a method performed by a user equipment (UE) for implementing an application-based network routing policy, the method comprising: providing, to an ANDSF server, UE profile information for a hardware and software configuration of the UE; receiving, from the ANDSF server, an application policy for offloading data for a software application arranged for operation on the UE, the application policy included in an ANDSF management object and specific to the hardware and software configuration of the UE; and operating the software application in connection with the application policy for offloading data, by routing data in the software application to an offloading network according to specifications of the application policy.

In Example 16, the subject matter of Example 15 can optionally include the application policy for offloading data including a first application policy defined for a flow-based policy within an inter-system routing policy, and a second application policy defined for a non-seamless offload-based policy within the inter-system routing policy.

In Example 17, the subject matter of one or any combination of Examples 15-16 can optionally include determining whether a flow-based or non-seamless-based traffic offloading is available in the software application, and selecting the first application policy or the second application policy based on the determination.

In Example 18, the subject matter of one or any combination of Examples 15-17 can optionally include operating a second software application in connection with the application policy for offloading data, by routing data in the second software application to the offloading network according to specifications of the application policy, the application policy including a second application policy for offloading data for the second software application.

In Example 19, the subject matter of one or any combination of Examples 15-18 can optionally include the UE profile information on a hardware and software configuration of the UE being provided in a management object from the UE during an Open Mobile Alliance Device Management (OMA-DM) exchange.

Example 20 can include, or can optionally be combined with all or portions of the subject matter of one or any combination of Examples 1-19 to include the subject matter embodied by an Evolved Packet Core or like system configuration, in wireless communication with a user equipment (UE) via a primary wireless network established by an evolved Node B (eNodeB), comprising: an Access Network Discovery and Selection Function (ANDSF) server, in operable communication with the eNodeB, and arranged to manage an ANDSF management object for controlling offloading of data traffic from one or more software applications operating in the UE to a remote secondary wireless network, and to exchange the ANDSF management object with the UE; a packet data network gateway, in operable communication with the eNodeB and the remote secondary wireless network, and arranged to facilitate the offloading of the data traffic to the remote secondary wireless network; wherein the ANDSF server is arranged to perform operations to: access UE profile information included in a user equipment profile node of the ANDSF management object, the UE profile information specific to an operating configuration of the UE; define an application node for inclusion in an inter-system routing policy (ISRP) node of the ANDSF management object, the application node providing one or more application-specific policies for offloading data for the software applications operating in the UE, and the application-specific policies controlling offloading to the remote secondary wireless network for the software applications operating in the UE; and provide the ANDSF management object including the ISRP node to the UE for implementation of the application-specific policies.

In Example 21, the subject matter of Example 20 can optionally include the ANDSF server being arranged to perform operations to determine the application-specific policies for offloading data for a particular software application of the software applications based on a hardware and software operating configuration of the particular software application indicated by the UE profile information.

In Example 22, the subject matter of one or any combination of Examples 20-21 can optionally include the hardware and software operating configuration of the particular software application indicated by the UE profile information including information identifying the particular software application using one or more of: software version, hardware version, hardware architecture, or operating system.

In Example 23, the subject matter of one or any combination of Examples 20-22 can optionally include the ISRP node providing specifications for flow-based offloading and for non-seamless-based offloading.

In Example 24, the subject matter of one or any combination of Examples 20-23 can optionally include the application node including an application identifier, the application identifier used to uniquely identify the software applications operating in the UE, wherein the ANDSF management object is structured in an eXtensible Markup Language (XML) format.

In Example 25, the subject matter of one or any combination of Examples 20-24 can optionally include the Evolved Packet Core conducting operations in accordance with a standard from a 3GPP Long Term Evolution or Long Term Evolution-Advanced (LTE/LTE-A) standards family, wherein the remote secondary wireless network is a wireless local area network operating in accordance with a standard from an IEEE 802.11 standards family.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. A multi-mode user equipment (UE), comprising:
one or more hardware processors configured to:
cause the UE to transmit a first Access Network Discovery and Selection Function (ANDSF) management object to an ANDSF server maintained within an

Evolved Packet Core of a carrier-based access network, the first ANDSF management object including UE profile information, the UE profile information including an operating system identifier (OSId) to uniquely identify a specific version of an operating system of the UE;

receive, from the ANDSF server, a second ANDSF management object, wherein the second ANDSF management object includes an inter-system routing policy (ISRP) provided in response to transmission of the OSId in the UE profile information, wherein the ISRP includes an application network routing rule for offloading data of a software application arranged for operation within the operating system of the UE, wherein the application network routing rule of the ISRP is customized to an operating system-specific application identifier (OSAppId) for the software application arranged for operation within the operating system of the UE, wherein the OSAppId is associated with the software application and uniquely identifies a specific version of the software application to execute on the specific version of the operating system of the UE, wherein a value for the OSAppID is defined in a first node of the ISRP, and wherein a value for the OSId is defined in a second node of the ISRP, and wherein the first node and the second node are nested in the ISRP under a third node indicating an application identifier (AppID), wherein the third node indicates use of the application network routing rule for data traffic sent from the software application within the operating system based on the first node and the second node; and perform offloading of data generated from the software application to a secondary access network in accordance with the ISRP.

2. The multi-mode UE of claim 1, wherein the UE profile information includes information for one or more aspects of the UE including a software version, a hardware version, or a hardware architecture.

3. The multi-mode UE of claim 1, wherein the ISRP includes a non-seamless offload-based routing rule defined in a fourth node of the ISRP.

4. The multi-mode UE of claim 1, wherein the ISRP includes a flow-based routing rule defined in a fifth node of the ISRP.

5. The multi-mode UE of claim 1, wherein the carrier-based access network operates in accordance with a standard from a 3GPP Long Term Evolution or Long Term Evolution-Advanced (LTE/LTE-A) standards family, and wherein the secondary access network operates in accordance with a standard from an IEEE 802.11 standards family.

6. The multi-mode UE of claim 1, comprising an accelerometer.

7. The multi-mode UE of claim 1, comprising:
a first transceiver arranged to communicate with the carrier-based access network; and
a second transceiver arranged to communicate with the secondary access network.

8. A method, performed at an Access Network Discovery and Selection Function (ANDSF) server, for establishing an application-based network routing policy, the method comprising:

receiving from a multi-mode user equipment (UE), a first ANDSF management object, the first ANDSF management object including UE profile information, the UE profile information including an operating system identifier (OSId) to uniquely identify a specific version of an operating system of the UE;

determining, based on the OSId, an application routing policy for offloading data from a primary access network to a secondary access network for a software application arranged to operate within the operating system of the UE;

defining an application node within an inter-system routing policy (ISRP) node of a second ANDSF management object, the application node including the application routing policy for offloading data to the secondary access network, wherein the application routing policy is customized to an operating system-specific application identifier (OSAppId) for the software application arranged to operate within the operating system of the UE, wherein the OSAppId is associated with the software application and uniquely identifies a specific version of the software application to execute on the specific version of the operating system of the UE, wherein a value for the OSAppID is defined in a first node located in the ISRP node, wherein a value for the OSId is defined in a second node located in the ISRP node, and wherein the first node and the second node are nested in the ISRP node under a third node indicating an application identifier (AppID), wherein the third node indicates use of the application routing policy for data traffic sent from the software application within the operating system based on the first node and the second node; and providing the second ANDSF management object to the UE.

9. The method of claim 8, wherein the ISRP node includes a flow-based routing rule defined in a fourth node located in the ISRP node.

10. The method of claim 8, wherein the ISRP node includes a non-seamless offload-based routing rule defined in a fifth node located in the ISRP node.

11. The method of claim 8, wherein obtaining the OSId includes obtaining the first ANDSF management object from the UE during an Open Mobile Alliance Device Management (OMA-DM) exchange.

12. The method of claim 8, wherein the first ANDSF management object and the second ANDSF management object are structured in an eXtensible Markup Language (XML) format.

13. The method of claim 8, wherein a distinct application node is included within the ISRP node for each application of the UE identified for inclusion in the application routing policy for offloading data to the secondary access network.

14. The method of claim 8, wherein the ANDSF server is provided within an Evolved Packet Core operating in accordance with a standard from a 3GPP Long Term Evolution or Long Term Evolution-Advanced (LTE/LTE-A) standards family, and wherein the secondary access network is a wireless local area network operating in accordance with a standard from an IEEE 802.11 standards family.

15. A non-transitory machine readable medium including instructions, which when performed by a machine, cause the machine to perform operations to:

transmit a first Access Network Discovery and Selection Function (ANDSF) management object to an ANDSF server maintained within an Evolved Packet Core of a carrier-based access network, the first ANDSF management object including user equipment (UE) profile information, the UE profile information including an operating system identifier (OSId) to uniquely identify a specific version of an operating system of the UE;

receive, from the ANDSF server, a second ANDSF management object, wherein the second ANDSF management object includes an inter-system routing policy (ISRP) provided in response to transmission of the OSId in the UE profile information, wherein the ISRP includes an application network routing rule for offloading data of a software application arranged for operation within the operating system of the UE, wherein the application network routing rule of the ISRP is customized to an operating system-specific application identifier (OSAppId) for the software application arranged for operation within the operating system of the UE, wherein the OSAppId is associated with the software application and uniquely identifies a specific version of the software application to execute on the specific version of the operating system of the UE, wherein a value for the OSAppID is defined in a first node of the ISRP, and wherein a value for the OSId is defined in a second node of the ISRP, and wherein the first node and the second node are nested in the ISRP under a third node indicating an application identifier (AppID), wherein the third node indicates use of the application network routing rule for data traffic sent from the software application within the operating system based on the first node and the second node; and perform offloading of data generated from the software application to a secondary access network in accordance with the ISRP.

16. The non-transitory machine readable medium of claim 15, wherein the UE profile information includes information for one or more of: a software version, a hardware version, or a hardware architecture.

17. The non-transitory machine readable medium of claim 15, wherein the ISRP includes a non-seamless offload-based routing rule defined in a fourth node of the ISRP.

18. The non-transitory machine readable medium of claim 15, wherein the ISRP includes a flow-based routing rule defined in a fifth node of the ISRP.

* * * * *